(12) United States Patent
Ganapathyraj et al.

(10) Patent No.: US 11,099,908 B2
(45) Date of Patent: *Aug. 24, 2021

(54) MEASURING PROVISIONING CAPACITY ACROSS DISTRIBUTED SYSTEMS

(71) Applicant: Microsoft Technology Licensing, LLC, Redmond, WA (US)

(72) Inventors: Pradeep Ganapathyraj, Bellevue, WA (US); Michael McLean, Snoqualmie, WA (US); Radu Serbanescu, Kirkland, WA (US); Meng Hua Chen, Issaquah, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 555 days.

This patent is subject to a terminal disclaimer.

(21) Appl. No.: 15/661,755

(22) Filed: Jul. 27, 2017

(65) Prior Publication Data
US 2017/0322833 A1 Nov. 9, 2017

Related U.S. Application Data

(63) Continuation of application No. 13/314,235, filed on Dec. 8, 2011, now Pat. No. 9,766,941.

(51) Int. Cl.
*G06F 9/50* (2006.01)
*H04L 12/24* (2006.01)
*H04L 12/26* (2006.01)

(52) U.S. Cl.
CPC .......... *G06F 9/5072* (2013.01); *H04L 41/048* (2013.01); *H04L 41/0806* (2013.01); *H04L 43/16* (2013.01); *G06F 2209/508* (2013.01); *Y02D 10/00* (2018.01)

(58) Field of Classification Search
CPC ...................................... G06F 9/5072
See application file for complete search history.

(56) References Cited

U.S. PATENT DOCUMENTS

| 5,655,081 | A | 8/1997 | Bonnell et al. |
| 6,192,454 | B1 | 2/2001 | De Vos |
| 6,446,211 | B1 | 9/2002 | Colvin |
| 6,704,732 | B1 | 3/2004 | Barclay |
| 7,200,657 | B2 | 4/2007 | Adams et al. |
| 7,685,261 | B1 | 3/2010 | Marinelli et al. |
| 7,698,414 | B1 | 4/2010 | Shelat et al. |
| 7,873,684 | B2 | 1/2011 | Souder et al. |

(Continued)

OTHER PUBLICATIONS

"Capacity Management and Sizing Overview for SharePoint Server 2010", Retrieved From <<https://web.archive.org/web/20110806061725/https://technet.microsoft.com/en-us/library/ff758647.aspx>>, Jun. 17, 2010, 16 Pages.

(Continued)

*Primary Examiner* — Nicholas P Celani
(74) *Attorney, Agent, or Firm* — NovoTechIP International PLLC

(57) ABSTRACT

Provisioning capacity measuring may be provided. First, a provisioning monitoring job may run on a grid manager that spawns a plurality of farm monitoring jobs onto a respective plurality of farms. Next, a user count for each of the respective plurality of farms may be respectively provided. The user count may comprise a number of users on each of the respective plurality of farms. An event alert may be provided when the user count for any of the respective plurality of farms is greater than a threshold.

19 Claims, 3 Drawing Sheets

(56) References Cited

U.S. PATENT DOCUMENTS

| | | |
|---|---|---|
| 9,766,941 B2 | 9/2017 | GanapathyRaj et al. |
| 2003/0069974 A1 | 4/2003 | Lu et al. |
| 2003/0187998 A1 | 10/2003 | Petit |
| 2006/0168136 A1 | 7/2006 | Bethlehem et al. |
| 2007/0283360 A1 | 12/2007 | Koretz et al. |
| 2008/0114878 A1 | 5/2008 | Gopalkrishnan et al. |
| 2009/0037367 A1 | 2/2009 | Wein |
| 2009/0241176 A1 | 9/2009 | Beletski et al. |
| 2010/0057831 A1 | 3/2010 | Williamson |
| 2010/0106809 A1 | 4/2010 | Grohman |
| 2010/0287019 A1 | 11/2010 | Guo et al. |
| 2010/0318847 A1 | 12/2010 | Beg et al. |
| 2010/0332617 A1 | 12/2010 | Goodwin et al. |
| 2011/0106939 A1 | 5/2011 | Kitamura et al. |
| 2011/0119680 A1 | 5/2011 | Li et al. |

OTHER PUBLICATIONS

"Scalability Study for Deploying VMware View on Cisco UCS and EMC Symmetrix V-Max Systems", Retrieved From <<https://web.archive.org/web/20110905204926/http://www.cisco.com/en/US/docs/solutions/Enterprise/Data_Center/App_Networking/vdiucswp.html>>, Aug. 11, 2011, 58 Pages.

Chong, et al., "Architecture Strategies for Catching the Long Tail", Retrieved from <<https://web.archive.org/web/20080502213217/http://msdn.microsoft.com/en-us/library/aa479069.aspx>>, Apr. 2006, 21 Pages.

"Final Office Action Issued in U.S. Appl. No. 13/314,235", dated May 7, 2015, 21 Pages.

"Non-final Office Action Issued in U.S. Appl. No. 13/314,235", dated Jun. 10, 2014, 15 Pages.

"Final Office Action Issued in U.S. Appl. No. 13/314,235", dated Nov. 19, 2014, 18 Pages.

"Final Office Action Issued in U.S. Appl. No. 13/314,235", dated Jul. 13, 2016, 21 Pages.

"Final Office Action Issued in U.S. Appl. No. 13/314,235", dated Dec. 2, 2015, 26 Pages.

"Non-Final Office Action Issued in U.S. Appl. No. 13/314,235", dated Apr. 7, 2016, 14 Pages.

"Non-Final Office Action Issued in U.S. Appl. No. 13/314,235", dated Dec. 9, 2016, 16 Pages.

"Notice of Allowance Issued in U.S. Appl. No. 13/314,235", dated Apr. 21, 2017, 12 Pages.

U.S. Appl. No. 13/314,235, Amendment and Response filed Sep. 10, 2014, 14 pages.

U.S. Appl. No. 13/314,235, Amendment and Response filed Mar. 19, 2015, 15 pages.

U.S. Appl. No. 13/314,235, Amendment and Response filed Sep. 8, 2015, 13 pages.

U.S. Appl. No. 13/314,235, Amendment and Response filed Feb. 22, 2016, 20 pages.

U.S. Appl. No. 13/314,235, Amendment and Response filed Jun. 13, 2016, 22 pages.

U.S. Appl. No. 13/314,235, Amendment and Response filed Oct. 13, 2016, 22 pages.

U.S. Appl. No. 13/314,235, Amendment and Response filed Mar. 7, 2017, 20 pages.

U.S. Appl. No. 13/314,235, Amendment after Allowance filed Jul. 19, 2017, 8 pages.

U.S. Appl. No. 13/314,235, USPTO Response to Amendment after Allowance dated Aug. 25, 2017, 2 pages.

MEASURING PROVISIONING CAPACITY ACROSS DISTRIBUTED SYSTEMS

CROSS-REFERENCE TO RELATED APPLICATIONS

This application is a continuation of U.S. patent application Ser. No. 13/314,235, filed on Dec. 8, 2011, entitled "MEASURING PROVISIONING CAPACITY ACROSS DISTRIBUTED SYSTEMS," which application is incorporated herein by reference. To the extent appropriate, a claim for priority is made to the above-identified application.

BACKGROUND

Cloud computing provides computation, software, data access, and storage services that do not require end-user knowledge of the physical location and configuration of the system that delivers the services. Parallels to this concept can be drawn with the electricity grid, wherein end-users consume power without needing to understand the component devices or infrastructure required to provide the service.

Cloud computing describes a new supplement, consumption, and delivery model for IT services based on Internet protocols, and it typically involves provisioning of dynamically scalable and often virtualized resources. It is a byproduct and consequence of the ease-of-access to remote computing sites provided by the Internet. This may take the form of web-based tools or applications that users can access and use through a web browser as if the programs were installed locally on their own computers.

SUMMARY

Provisioning capacity measuring may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Provisioning capacity measuring may be provided. First, a provisioning monitoring job may run on a grid manager that spawns a plurality of farm monitoring jobs onto a respective plurality of farms. Next, a user count for each of the respective plurality of farms may be respectively provided. The user count may comprise a number of users on each of the respective plurality of farms. An event alert may be provided when the user count for any of the respective plurality of farms is greater than a threshold.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
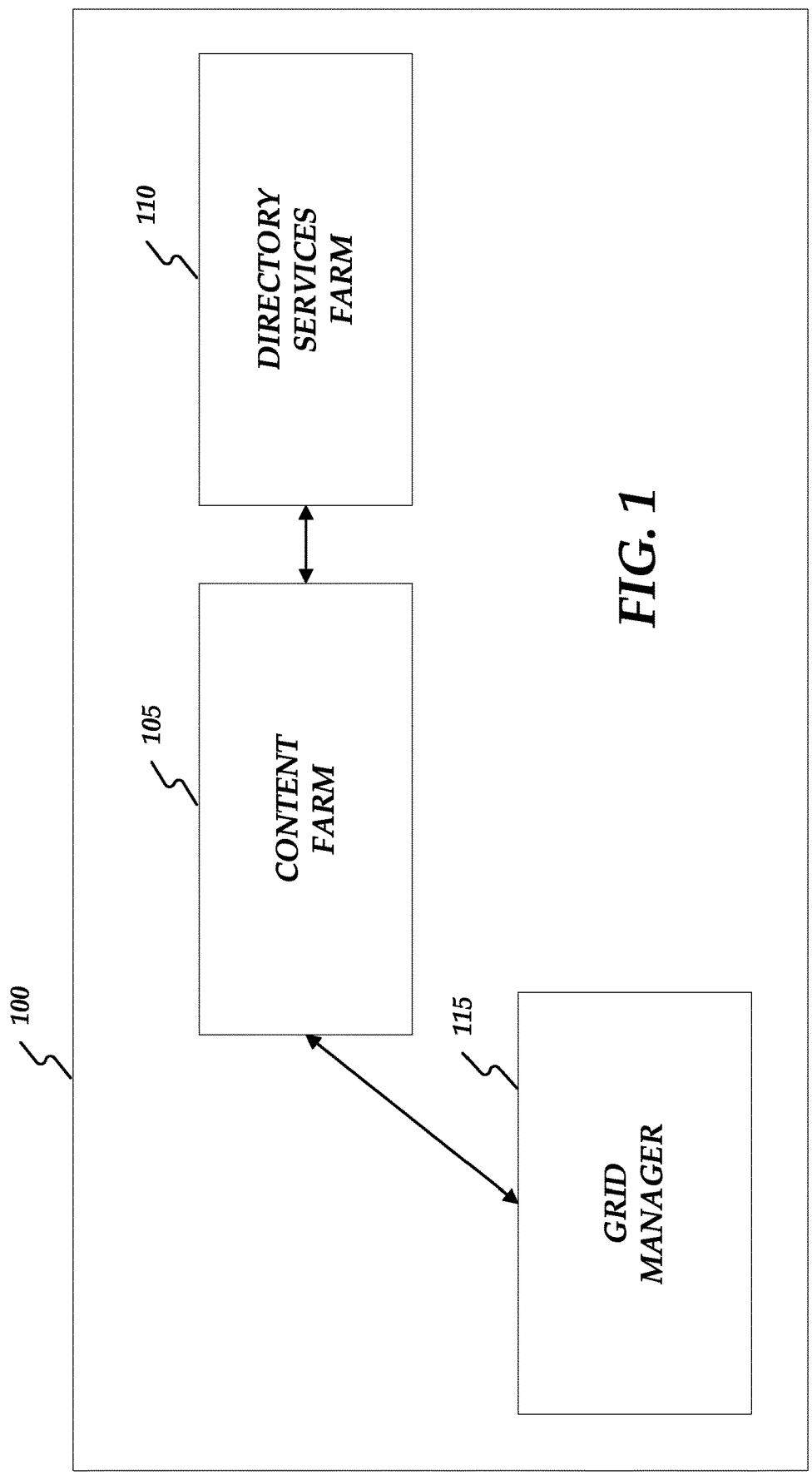
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Cloud computing systems may use web application platforms (e.g. SharePoint Online™) to support tenants and users corresponding to the tenants. As cloud computing systems continue to grow and service larger customers, the system may need to continuously track the number of tenants and users that have been provisioned in various parts of the system. This information may be used to make strategic decisions regarding when, for example, to close content farms, directory services farms (e.g. SharePoint Online™ directory services (SPODS) farms), tenant placement, and when to divert traffic to utilize resources more efficiently. Conventional systems have not been able to report data real-time, typically resulting, for example, in a large lag until operations engineers can execute a query.

Embodiments consistent with the invention may track and monitor the number of tenants and users that have been provisioned throughout various parts of a system. A new provisioning monitoring job may be scheduled in a grid manager that then spawns related jobs for each farm. Licensed and unlicensed user counts may be aggregated in both content farms and directory services farms, pushed back to the grid manager, and stored in a grid database. Thresholds may be set, for example, at 50%, 75%, 90%, and 100%. If these thresholds are reached, an event may be fired to notify operations engineers.

FIG. 1 is a block diagram of an operating environment 100. Operating environment 100 may comprise, but is not limited to, a cloud computing system using a web application platform operated on the Internet. Operating environment 100 may comprise at least one content farm 105, at least one directory services farm 110, and a grid manager 115 connected together by a network. Directory services farm 110 may comprise, but is not limited to, a SharePoint Online™ directory services (SPODS) farm. While only one content farm and one directory services farm is shown in FIG. 1, operating system 100 may include any number of content farms and directory services farms. Each farm (i.e. content farm 105 and directory services farm 110) may have a limit to the number of tenants, licensed users, and unlicensed users that it can provision. A farm may comprise a collection of computer servers maintained to accomplish server needs beyond the capability of one machine. As will be described in greater detail below with respect to FIG. 3, a computing device 300 may comprise an operating environment for content farm 105, directory services farm 110, or grid manager 115.

When operating environment 100 is created, a provisioning monitoring job may be started. The provisioning monitoring job may run on grid manager 115 and may be configurable to run for all networks or a specific network (e.g. operating environment 100.) The provisioning monitoring job may then spawn additional jobs on content farm 105 and on directory services farm 110. If other content farms and other directory services farms exist in operating environment 100, provisioning monitoring job may spawn additional jobs on these additional other content farms and other directory services farms. The additional job spawned on directory services farm 110 may calculate a count of licensed users and unlicensed users within directory services farm 110, while also determining the directory services farm (e.g. directory services farm 110) in which the calculate licensed users and unlicensed users reside. These calculated counts may then be returned to content farm 105 where they are aggregated by the additional job spawned on content farm 105 to tally a count of users per content farm. The aggregation may happen on content farm 105 because an assumption may not be made that all users within a given content farm (e.g. content farm 105) reside in the same directory services farm (e.g. directory services farm 110).

The job spawned on content farm 105 may then return the counts of licensed users and unlicensed users per content farm (e.g. content farm 105) and directory services farm (e.g. directory services farm 110) to the grid manager 115 to store in a grid manager database. This may allow reporting to a central location within operating environment 100. Capacity thresholds may be defined for the various components (e.g. content farm 105 and directory services farm 110) of operating environment 100. If a component reaches, for example, 50%, 75%, 90%, or 100% capacity, an alert may fire. This gradual step approach may provide ample warning for an operations team if they need to take action to close farms, stand up new farms, or move tenants.

Figure 2:
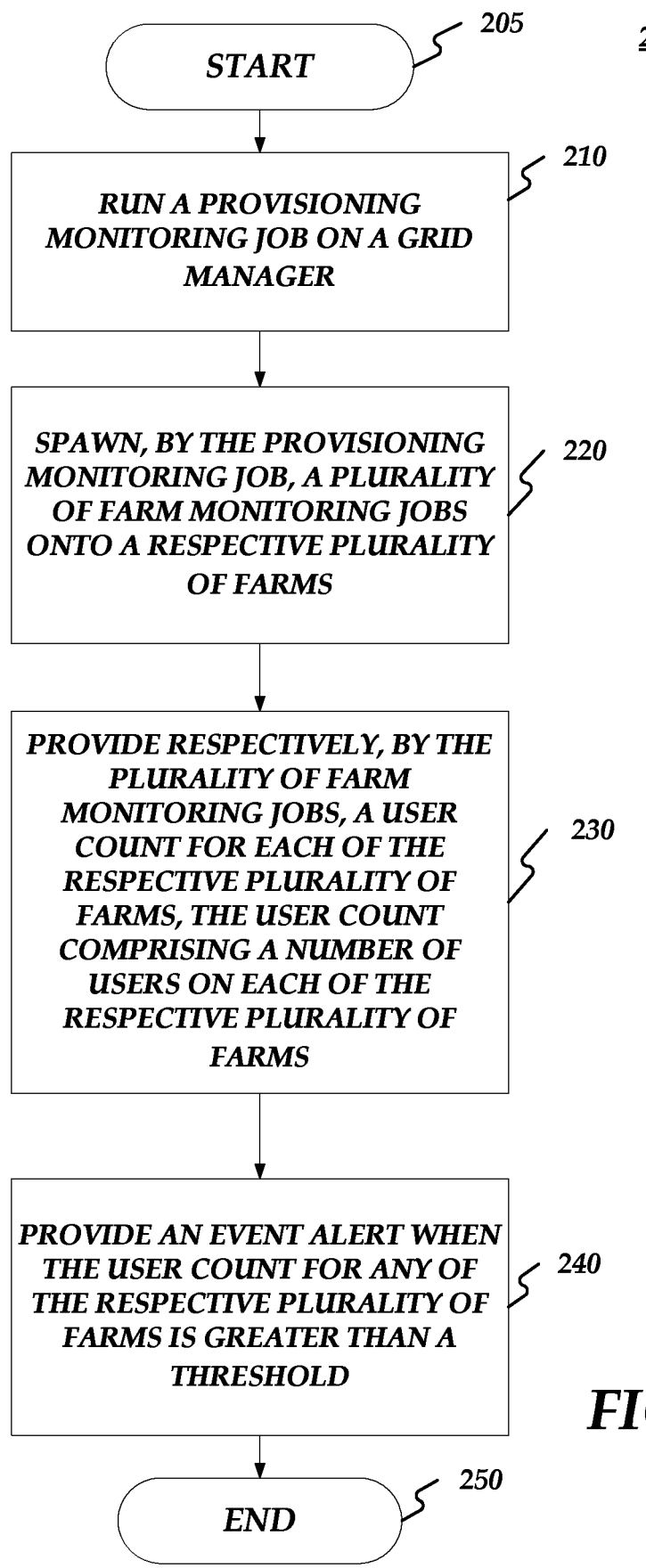
FIG. 2 is a flow chart of a method for measuring provisioning capacity.

FIG. 2 is a flow chart setting forth the general stages involved in a method 200 consistent with an embodiment of the invention for measuring provisioning capacity. Method 200 may be implemented using one or more of computing device 300 as described in more detail below with respect to FIG. 3. Ways to implement the stages of method 200 will be described in greater detail below.

Method 200 may begin at starting block 205 and proceed to stage 210 where grid manager 115 may run a provisioning monitoring job. For example, the provisioning monitoring job may comprise a computer program that may run on grid manager 115 and may be configurable to run for all networks or a specific network (e.g. operating environment 100.)

From stage 210, where grid manager 115 runs the provisioning monitoring job, method 200 may advance to stage 220 where the provisioning monitoring job may spawn a plurality of farm monitoring jobs onto a respective plurality of farms. The plurality of farms may comprise, for example, content farm 105 and directory services farm 110. While running on grid manager 115, the provisioning monitoring job may provide farms running in operating environment 100 with farm monitoring jobs comprising computer programs. For example, the provisioning monitoring job may provide content farm 105 with a content farm monitoring job. Moreover, the provisioning monitoring job may provide directory services farm 110 with a directory services farm monitoring job.

Once the provisioning monitoring job spawns the plurality of farm monitoring jobs in stage 220, method 200 may continue to stage 230 where the plurality of farm monitoring jobs may respectively provide a user count for each of the respective plurality of farms. The user count may comprise a number of users on each of the respective plurality of farms. For example, licensed and unlicensed user counts may be aggregated in both content farm 105 and directory services farm 110. These counts may be pushed back over the network to grid manager 115 and stored in the grid database on grid manager 115.

Consistent with embodiments of the invention, the directory services farm monitoring job may calculate the user count of licensed and unlicensed users within directory services farm 110. In addition, the directory services farm monitoring job may note a content farm (e.g. content farm 105) in which the calculated users reside. The calculate user count may then be sent to content farm 105. The content farm monitoring job running on content farm 105 may then aggregate these numbers to tally an exact count of users on content farm 105. The aggregation may be performed by the content farm monitoring job running on content farm 105 because an assumption may not be made that all users within content farm 105 reside in directory services farm 110. The content farm monitoring job running on content farm 105 may then send the counts of licensed/unlicensed users per content farm 105 and directory services farm 110 to the grid manager 115 to store in the grid manager database. This may allow reporting off to a central location within the web application platform running in operating environment 100.

After the plurality of farm monitoring jobs respectively provides the user count for each of the respective plurality of farms in stage 230, method 200 may proceed to stage 240 where grid manager 115 may provide (e.g. display) an event alert when the user count for any of the respective plurality of farms is greater than a threshold. For example, if the number of users on content farm 105 has reached a first threshold (e.g. 50% of content farm 105's capacity), then grid manager 115 may provide (e.g. display) a first event alert comprising a "yellow alert." If the number of users on content farm 105 continues to grow and reaches a second threshold (e.g. 75% of content farm 105's capacity), then grid manager 115 may provide (e.g. display) a second event alert comprising an "orange alert." This may continue for any capacity levels. Also, the same event alert process may apply to directory services farm 110. This gradual step approach may provide ample warning for an operations engineering team to take action to, for example, close farms, stand up new farms, or move tenants or users. Once grid manager 115 provides the event alert in stage 240, method 200 may then end at stage 250.

An embodiment consistent with the invention may comprise a system for measuring provisioning capacity. The system may comprise a memory storage and a processing unit coupled to the memory storage. The processing unit may be operative to spawn a plurality of farm monitoring jobs onto a respective plurality of farms. In addition, the processing unit may be operative to respectively receive a user count for each of a respective plurality of farms. The user count may comprise a number of users on each of the respective plurality of farms. Furthermore, the processing unit may be operative to provide an event alert when the user count for any of the respective plurality of farms is greater than a threshold.

Figure 3:
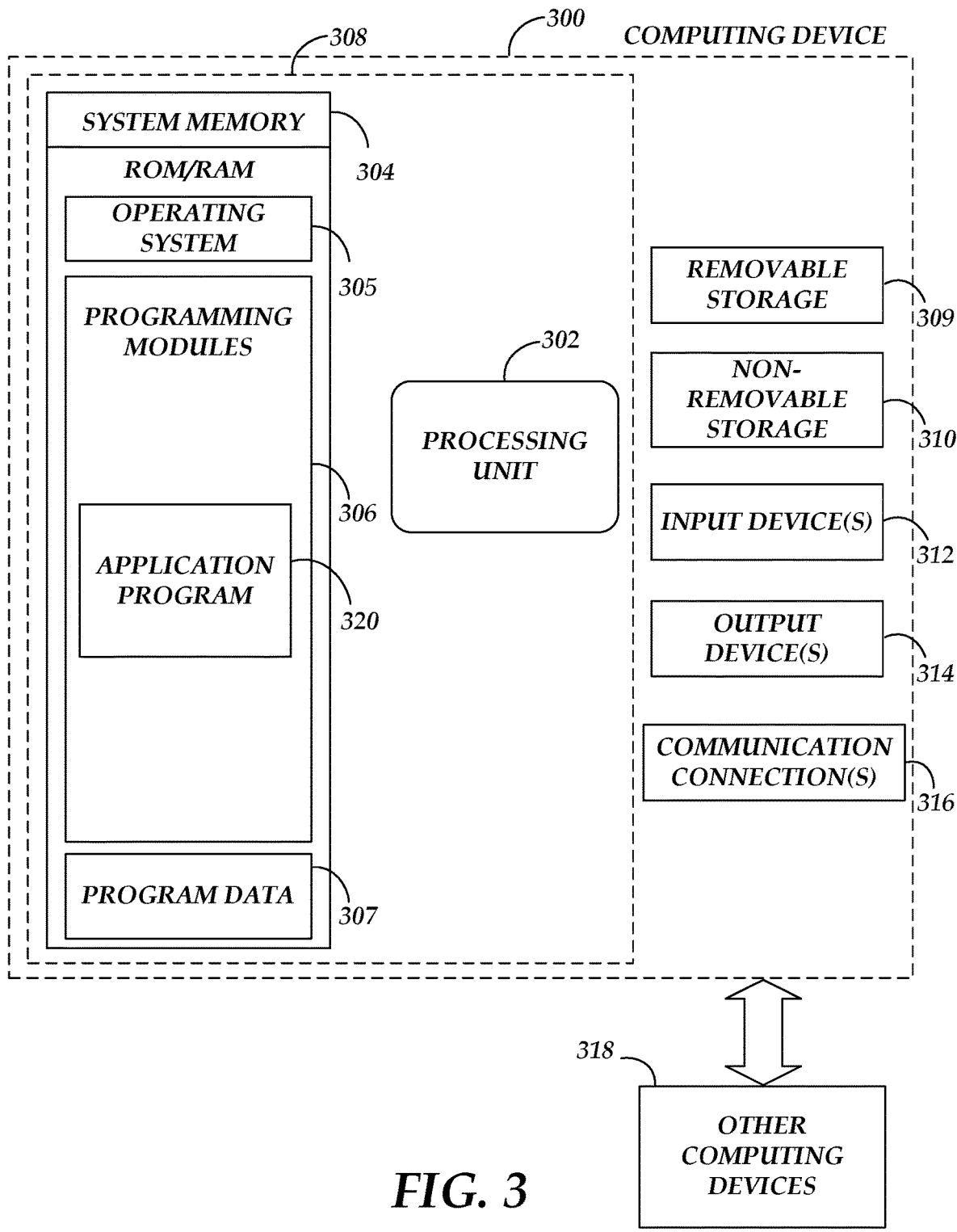
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise an operating environment for system 100 as described above. System 100 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a program data 307. Program data 307 may comprise the grid manager database when computing device 300 comprises grid manger 115. Operating system 305, for example, may be suitable for controlling computing device 300's operation. In one embodiment, programming modules 306 may include application program 320. Application program 320 may comprise the provisioning monitoring job when computing device 300 comprises grid manager 115. In addition, application program 320 may comprise the content farm monitoring job when computing device 300 comprises content farm 105. And application program 320 may comprise the directory services farm monitoring job when computing device 300 comprises directory services farm 110. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow computing device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g. application program 320) may perform processes including, for example, one or more method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Embodiments of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the invention, may be performed via application-specific logic integrated with other components of computing device 300 on the single integrated circuit (chip).

Computing device 300 may be coupled to a camera that may be operative to record a user and capture motions and/or gestures made by the user. Computing device 300 may be further operative to capture words spoken by the user, such as by a microphone, and/or capture other inputs from the user such as by a keyboard and/or mouse (not pictured). Consistent with embodiments of the invention, the camera may comprise any motion detection device capable of detecting the movement of the user. For example, the camera may comprise a Microsoft® Kinect® motion capture device comprising a plurality of cameras and a plurality of microphones.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for measuring provisioning capacity, the method comprising:
   executing a provisioning monitoring job on a grid manager;
   executing, by the provisioning monitoring job, a plurality of farm monitoring jobs onto a plurality of farms associated with the grid manager, the plurality of farm monitoring jobs comprising a plurality of content farm monitoring jobs to monitor a plurality of content farms associated with the grid manager and a plurality of directory service monitoring jobs to monitor a plurality of directory service farms associated with the plurality of content farms;
   receiving, from the plurality of directory service monitoring jobs, a user count for each of the respective plurality of directory service farms, the user count for each of the plurality of directory service farms comprising a number of users associated with each of the plurality of directory service farms and an indication of one of the plurality of content farms in which each of the users associated with each of the plurality of directory service farms reside;
   receiving, from the plurality of the content farm monitoring jobs, the user count for each of the respective plurality of content farms;
   aggregating the user count and the indications received for the plurality of directory service farms;
   determining the user count for each of the plurality of content farms and the user count for each of the plurality of directory service farms; and
   providing an event alert when the user count for one of the respective plurality of farms is greater than a threshold comprising a fraction of a capacity level of the one of the plurality of farms.

2. The method of claim 1, wherein executing the provisioning monitoring job on the grid manager comprises executing the provisioning monitoring job on the grid manager being configured to run on a network including the plurality of farms.

3. The method of claim 1, wherein executing the provisioning monitoring job on the grid manager comprises executing the provisioning monitoring job on the grid manager periodically.

4. The method of claim 1, wherein receiving the user count for each of the respective plurality of farms comprises receiving the user count at the grid manager.

5. The method of claim 1, further comprising saving, to a grid manager database, the user count for each of the respective plurality of farms.

6. The method of claim 1, further comprising saving, to a grid manager database, the user count for each of the respective plurality of farms, the grid manager database residing on the grid manager.

7. The method of claim 1, wherein providing the event alert comprises providing the event alert by the grid manager.

8. A system for measuring provisioning capacity, the system comprising:
 a memory storage; and
 a processor coupled to the memory storage, wherein the processor is operative to:
  execute a provisioning monitoring job on a grid manager;
  execute, by the provisioning monitoring job, a plurality of farm monitoring jobs onto a plurality of farms associated with the grid manager, the plurality of farm monitoring jobs comprising a plurality of content farm monitoring jobs to monitor a plurality of content farms associated with the grid manager and a plurality of directory service monitoring jobs to monitor a plurality of directory service farms associated with the plurality of content farms;
  receive, from the plurality of directory service monitoring jobs, a user count for each of the respective plurality of directory service farms, the user count for each of the plurality of directory service farms comprising a number of users associated with each of the plurality of directory service farms and an indication of one of the plurality of content farms in which each of the users associated with each of the plurality of directory service farms reside;
  receive, from the plurality of the content farm monitoring jobs, the user count for each of the respective plurality of content farms;
  aggregate the user count and the indications received for the plurality of directory service farms;
  determine the user count for each of the plurality of content farms and the user count for each of the plurality of directory service farms; and
  provide an event alert when the user count for one of the respective plurality of farms is greater than a threshold comprising a fraction of a capacity level of the one of the plurality of farms.

9. The system of claim 8, wherein the processor being further operative to save, to a grid manager database, the user count for each of the respective plurality of farms.

10. The system of claim 8, wherein executing the provisioning monitoring job on the grid manager comprises executing the provisioning monitoring job on the grid manager being configured to run on a network including the plurality of farms.

11. The system of claim 8, wherein executing the provisioning monitoring job on the grid manager comprises executing the provisioning monitoring job on the grid manager periodically.

12. The system of claim 8, wherein each of the plurality of farms comprises a plurality of computer servers cooperating to accomplish server requirements beyond a capability of any single one of the plurality of servers.

13. The system of claim 8, wherein the capacity level comprises a limit on a number of licensed users and a number of unlicensed users associated with each of the plurality of farms.

14. A method of measuring provisioning capacity, the method comprising:
 executing a provisioning monitoring job on a grid manager;
 executing, by the provisioning monitoring job, a plurality of directory service farm monitoring jobs onto each of a plurality of directory services farms associated with plurality of content farms associated with the grid manager, wherein each of the plurality of directory service farm monitoring jobs provides: (i) a user count associated with each of the plurality of directory service farms; and (ii) an indication of one of the plurality of content farms with which each of the users associated with each of the plurality of directory service farms is associated;
 executing, by the provisioning monitoring job, a content farm monitoring job onto each of the plurality of content farms, wherein a first content farm monitoring job uses the user counts and the indications provided by the plurality of directory service farm monitoring jobs to aggregate the count users to tally the user count associated with a first content farm;
 receiving, by the grid manager, the aggregated user count for each of the content farms and the user count for each of the plurality of directory service farms; and
 providing, by the grid manager, an event alert when the user count of one of the plurality of directory service farms or the plurality of content farms is greater than a threshold comprising a fraction of a capacity level of the one of the plurality of content farms or the plurality of directory service farms, wherein each of the plurality of farms is associated with a plurality of thresholds comprising a first threshold and a second threshold, the second threshold being higher than the first threshold, and wherein providing the event alert comprises:
  providing, when the user count for one of the respective plurality of farms is greater than the first threshold, a first event alert, and
  providing, when the user count for one of the respective plurality of farms increases to the second threshold, a second event alert.

15. The method of claim 14, further comprising storing, in a database associated with the grid manager, a count of licensed users and a count of unlicensed users within each of the plurality of content farms and the plurality of directory services farms.

16. The method of claim 1, wherein each of the plurality of farms is associated with a plurality of thresholds comprising a first threshold and a second threshold, the second threshold being higher than the first threshold, and wherein providing the event alert comprises:
 providing, when the user count for one of the respective plurality of farms is greater than the first threshold, a first event alert, and providing, when the user count for one of the respective plurality of farms increases to the second threshold, a second event alert.

17. The system of claim 8, wherein each of the plurality of farms is associated with a plurality of thresholds comprising a first threshold and a second threshold, the second threshold being higher than the first threshold, and wherein providing the event alert comprises:
providing, when the user count for one of the respective plurality of farms is greater that the first threshold, a first event alert, and
providing, when the user count for one of the respective plurality of farms increases to the second threshold, a second event alert.

18. The method of claim 14, wherein executing the provisioning monitoring job on the grid manager comprises executing the provisioning monitoring job on the grid manager being configured to run on a network including the plurality of farms.

19. The method of claim 14, wherein executing the provisioning monitoring job on the grid manager comprises executing the provisioning monitoring job on the grid manager periodically.

\* \* \* \* \*